Patented Dec. 4, 1928.

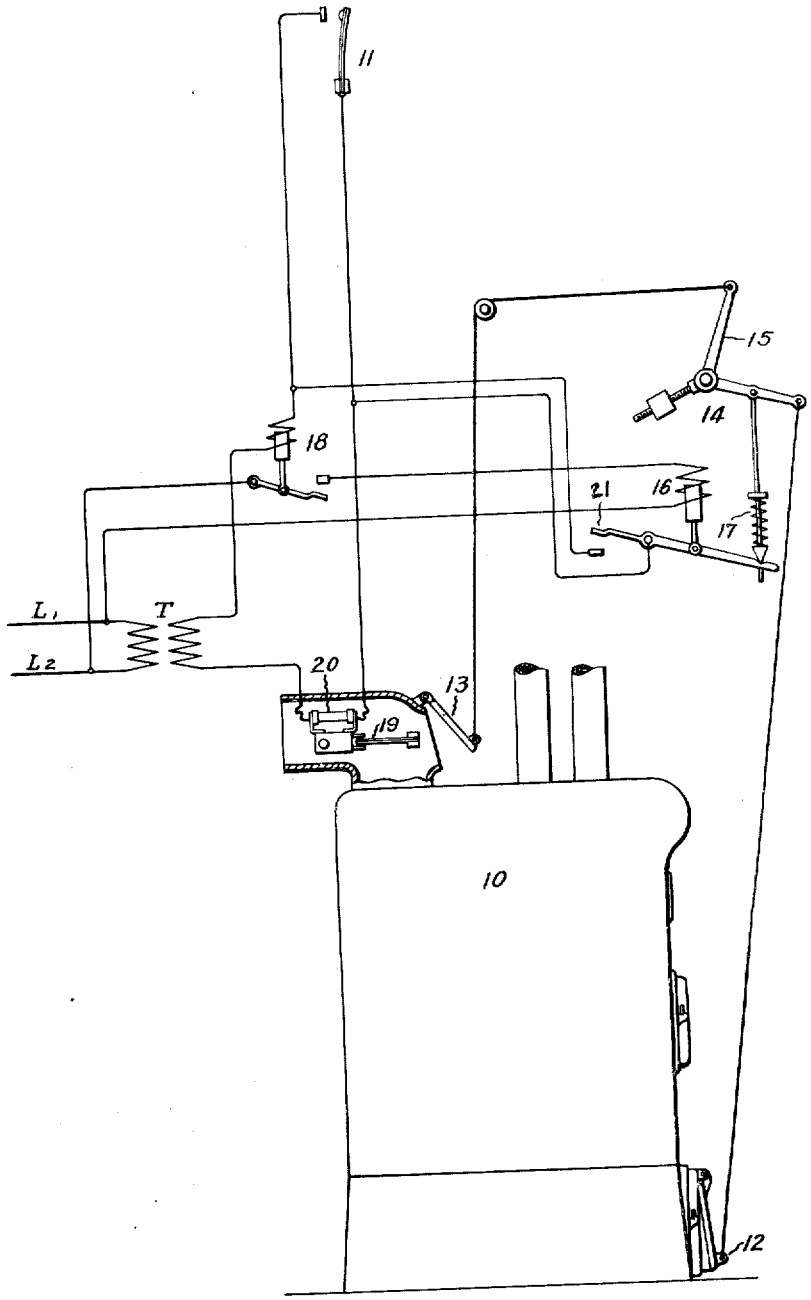

1,694,323

UNITED STATES PATENT OFFICE.

GEORGE H. JUMP, OF BUFFALO, NEW YORK, ASSIGNOR TO GENERAL ELECTRIC COMPANY, A CORPORATION OF NEW YORK.

HEATING CONTROL SYSTEM.

Application filed March 15, 1927. Serial No. 175,597.

The invention relates to heating control systems, particularly thermostatic control systems for regulating the operation of a heating device, such for example as a heating furnace or the like, so as to maintain desired temperature conditions in a living room or any other medium heated by the device.

In practically all forms of heating systems there is an inherent lag between variation in the heating action of the heating means and the resulting change in temperature of the medium heated thereby. Also with most forms of heating means there is an inherent lag in the response thereof to any control of the heating action. This is particularly true of combustion furnaces such as commonly used in domestic or house heating systems and presents one of the principal difficulties encountered in automatic thermostatic control systems for such furnaces. For example, with most of the ordinary types of domestic heating furnaces controlled by a room thermostat, the furnace almost invariably overshoots or continues to supply an excessive amount of heat to the rooms of the house after the thermostat has operated to reduce the heating action of the furnace. This is due to what may be called the heating momentum acquired by the furnace during the acceleration of combustion necessary to raise the temperature of the room to the value at which the room thermostat operates. This heating momentum causes the temperature of the room to continue to rise even after the thermostat has functioned to reduce the heating effect of the furnace. Likewise when the increase in room temperature finally is checked by operation of the control means to reduce the heating effect of the furnace there is the tendency to undershoot due to the inability of the furnace to respond immediately to the call for increased heat by the automatic thermostatic control when the room temperature finally falls below the desired value.

The principal object of the present invention is to provide an improved thermostatic heating control system wherein the possibility of overshooting, as well as undershooting of the desired temperature, as outlined above, is reduced to a minimum.

While the invention is not necessarily limited thereto it may be applied with particular advantage to automatic control systems for domestic heating furnaces wherein the heating is controlled by operating the draft dampers of the furnace. In carrying the invention into effect in the preferred form in such a heating system a room thermostat is employed for controlling the opening of the dampers when the room temperature falls below a certain desired value. An additional thermostatic control element is arranged to cooperate with the room thermostat in controlling the operation of the dampers and the additional thermostatic control element is located so as to be heated directly in response to the temperature of the furnace. The additional thermostatic control element may be located in the flue pipe of the furnace or in any other suitable location where it will be heated in accordance with the temperature of the furnace.

In accordance with the present invention the cooperating relation between the two thermostatic control elements is such that the two elements jointly control the opening of the furnace dampers to increase the heating of the room while the second thermostatic element separately controls the closing of the dampers when the temperature of the furnace has reached a value such that the continued heating effect thereof on the room ordinarily will raise the room temperature above the predetermined minimum temperature at which the room thermostat operates. Preferably the furnace dampers are operated through the agency of an electroresponsive device such as an electromagnet, motor, or the like, and the two cooperating thermostatic elements are provided with suitable switch mechanism and connections for effecting operation of the electroresponsive draft operating device to regulate the heating action of the furnace as indicated above.

The single figure in the accompanying drawing is a schematic diagram of a domestic heating furnace control system embodying a preferred form of the present invention.

As shown in the drawing, the furnace 10 is of the usual steam or hot water boiler type and is connected to supply heat to the room in which the room thermostat 11 is located, through the agency of the usual radiators and interconnecting piping which however are not shown in the drawing. The ash pit damper 12 and the flue or check damper 13 of the furnace are operated by means of the electroresponsive operating mechanism 14. This mechanism, as shown, comprises the double bell crank operating lever 15 and the operating electromagnet 16 therefor. The bell crank lever 15 is suitably connected to the dampers 12 and 13, as indicated in the drawing, and preferably is operated by the electromagnet 16 through a resilient connection 17.

The operating winding of the electromagnet 16 is arranged to be energized under the control of the electrically operated switch 18 from suitable supply lines $L_1$—$L_2$ which may be the usual alternating current house lighting mains.

The circuit of the switch 18 is controlled by the room thermostatic switch 11 and in accordance with the usual practice the transformer T is provided for supplying relatively low voltage control current for the thermostatic control circuit. The room thermostat 11 is shown as of the bi-metallic type, although it may be of any usual type arranged to close the circuit when the room temperature falls below a certain desired value and to remain in the circuit opening position as long as the room temperature is above this value. A second thermostatic control switch 19, preferably, is located in the flue pipe of the furnace 10, as indicated in the drawing. In this way the thermostatic switch 19 is heated directly in accordance with the temperature of the furnace, although it will be understood that the same result may be obtained by locating the thermostatic switch 19 in any other part of the furnace. As shown the thermostatic switch 19 is of the type having a tilting mercury tube 20 for opening and closing the circuit.

The operation of the heating control system is as follows:

Assuming the furnace supplied with fuel and the draft dampers 12 and 13 in their respective positons shown in the drawing, the furnace draft is cut off and the heating action of the furnace is checked. Consequently the temperature of the room wherein the thermostatic switch 11 is located may be assumed to be slowly decreasing. Also the thermostatic switch 19 is maintained in the circuit closing position due to the furnace 10 being checked and the resulting flue temperature being at a low value. When the room temperature falls to the value at which the contacts of the room thermostatic switch 11 are closed, an energizing circuit for the operating winding of the switch 18 is completed from the secondary winding of the transformer T through the operating winding switch 18, the contacts of the room thermostat 11 and through the tilting mercury switch 20 of the flue pipe thermostatic switch 19.

Upon the closure of switch 18 the operating winding of the electromagnet 16 is connected directly with the supply lines $L_1$—$L_2$. This results in the response of the electromagnet 16 to operate the double bell crank lever 15 in a counterclockwise direction through the resilient connection 17. The resilient connection permits immediate response of the armature of the electromagnet 16 and cushions the closure of the check damper 13 and the opening of the ash door damper 12. Immediately upon operation of the electromagnet 16 the auxiliary contact 21 associated therewith is closed. This short circuits the contacts of the room thermostat 11 and thereby places the interruption of the energizing circuit of switch 18 and consequently of the electromagnet 16 entirely under the control of the flue thermostatic switch 19.

With the ash door damper 12 open and the check damper 13 closed, combustion in the furnace 10 is accelerated and the heating effect thereof increased. As the combustion in the furnace 10 increases, the flue temperature to which the thermostatic switch 19 is subjected correspondingly increases until finally a value is reached at which the mercury switch 20 is tilted to open the circuit. This results in the deenergization of the switch 18 and the latter opens in accordance with its bias to interrupt the energizing circuit of the electromagnet 16. The latter thereupon operates to return the double bell crank lever 15 to the position in which it is shown, thereby reclosing the ash door damper 12 and reopening the check damper 13.

Due to the fact that the flue thermostatic switch 19 always responds to the increased heating effect produced by opening of the dampers of the furnace before the room temperature is raised to the value at which the contacts of the room thermostat 11 are opened, the draft of the furnace 10 is checked so as to prevent excessive over-shooting of the temperature in the room. In this way the furnace 10 continues to supply heat to the room even though the drafts are checked and finally raises the temperature to the value at which the room thermostat contacts are opened. However, as the combustion in the furnace soon decreases due to the operation of the dampers to check the draft, the flue temperature of the furnace consequently decreases and permits the flue thermostat 19 to reclose the tilting mercury switch 20. This however produces no effect until the room thermostat 11 is reclosed due to a decrease in the room temperature as previously described.

From the foregoing it will be seen that my improved control system inherently functions to cut off the draft to the furnace before the room temperature actually exceeds the temperature at which the room thermostat is arranged to respond. However, the momentum acquired by the furnace during the acceleration of combustion causes the furnace to continue to supply heat to the room until the desired temperature is reached. This permits a very close regulation of the room temperature with the possibility of overshooting materially reduced.

What I claim as new and desire to secure by Letters Patent of the United States, is,—

1. A heating control system comprising means for heating a medium, electroresponsive means arranged upon energization thereof to operate to increase the heating action of said heating means and upon deenergization thereof to operate to decrease the heating action of said heating means, a pair of independently operable thermal responsive circuit controlling members, the first responsive to the temperature of the medium and the second responsive to the temperature of the heating means therefor, electrical connections jointly controlled by said thermal responsive circuit controlling members for establishing an energizing circuit for said electroresponsive regulating means to effect operation thereof to increase the heating action of said heating means, and auxiliary switch mechanism arranged to be operated upon operation of the electroresponsive means to increase the heating action of said heating means for rendering the first thermal responsive member ineffective to interrupt the energizing circuit of said electroresponsive means and connecting the said energizing circuit of said electroresponsive regulating means to be interrupted exclusively by said second thermal responsive member for decreasing the heating action of the heating means.

2. A heating control system comprising means for heating a medium, an electroresponsive regulating device therefor operable upon energization thereof to increase the heating action of said heating means and upon deenergization thereof to decrease the heating action of said heating means, a pair of thermal responsive circuit controlling elements for controlling the energizing circuit of said electroresponsive regulating device, the first operable to a circuit closing position when the temperature of the heating means is below a predetermined value and operable to a circuit opening position when the temperature of the heating means is above said value and the second operable to a circuit closing position when the temperature of the medium is below a predetermined value and to a circuit opening position when the temperature of the medium is above said value, connections through which the control members establish an energizing circuit to operation of said electroresponsive device to increase the heating action when both the medium and the heating means are below said predetermined temperatures, and auxiliary switch mechanism associated with said electroresponsive regulating device and connected to short circuit the thermal control member responsive to the temperature of the medium upon said operation of said device.

3. A furnace control system comprising means for regulating the draft of the furnace to vary the heating effect thereof, electroresponsive means for operating said draft regulating means and arranged upon energization thereof to operate to increase the furnace draft and upon deenergization thereof to operate to decrease the furnace draft, a thermostatic control member responsive to the temperature of the furnace, a second thermal responsive control member responsive to the temperature of the medium heated by the furnace, and connections through which the said control elements cooperate to establish an energizing circuit for said electroresponsive means when the temperature of the medium and of the furnace are below predetermined values and through which the first thermal responsive control element operates exclusively to open the energizing circuit of said electroresponsive means.

4. A heating control system comprising means for heating a medium, electroresponsive means operable upon energization thereof to increase the heating action of said heating means and upon deenergization thereof to decrease the heating action of said means, an electromagnetic line switch for controlling the energizing circuit of said electroresponsive means, said switch being biased to the circuit opening position and operable to the circuit closing position upon energization thereof, a separate low voltage source for energizing said electromagnetic line switch, thermostatic circuit controlling means for establishing and interrupting the low voltage energizing circuit of said line switch, and an auxiliary switch associated with said electroresponsive means and connected to cooperate with said thermostatic circuit controlling means in maintaining the low voltage energizing circuit of said line switch established after operation of said electroresponsive control means to increase the heating action of said heating means.

5. A heating control system comprising means for heating a medium, a regulating device therefor having an operating winding arranged upon energization thereof to increase the heating action of said heating means and upon deenergization thereof to decrease the heating action of said heating means, an electromagnetic line switch for connecting and disconnecting said operating winding from a source of supply, a separate low voltage source for energizing said electromagnetic line switch, a pair of thermostatic circuit controlling elements one responsive to the temperature of the heating means and the second responsive to the temperature of the medium heated thereby, connections through which said elements jointly complete the low voltage energizing circuit for said line switch to effect operation of the regulating device to increase the heating action of said heating means, and an auxiliary switch arranged to be operated upon said operation of the heating means for short circuiting the first of said thermostatic elements to place the low voltage energizing circuit of said line switch under the separate control of said second thermostatic element.

In witness whereof, I have hereunto set my hand this tenth day of March, 1927.

GEORGE H. JUMP.

CERTIFICATE OF CORRECTION.

Patent No. 1,694,323.  Granted December 4, 1928, to

GEORGE H. JUMP.

It is hereby certified that error appears in the printed specification of the above numbered patent requiring correction as follows: Page 3, line 60, claim 2, before the word "establish" insert the word "jointly" and the same line after the word "to" insert the word "effect"; and that the said Letters Patent should be read with these corrections therein that the same may conform to the record of the case in the Patent Office.

Signed and sealed this 15th day of January, A. D. 1929.

M. J. Moore,
Acting Commissioner of Patents.

(Seal)

through which said elements jointly complete the low voltage energizing circuit for said line switch to effect operation of the regulating device to increase the heating action of said heating means, and an auxiliary switch arranged to be operated upon said operation of the heating means for short circuiting the first of said thermostatic elements to place the low voltage energizing circuit of said line switch under the separate control of said second thermostatic element.

In witness whereof, I have hereunto set my hand this tenth day of March, 1927.

GEORGE H. JUMP.

CERTIFICATE OF CORRECTION.

Patent No. 1,694,323.                         Granted December 4, 1928, to

GEORGE H. JUMP.

It is hereby certified that error appears in the printed specification of the above numbered patent requiring correction as follows: Page 3, line 60, claim 2, before the word "establish" insert the word "jointly" and the same line after the word "to" insert the word "effect"; and that the said Letters Patent should be read with these corrections therein that the same may conform to the record of the case in the Patent Office.

Signed and sealed this 15th day of January, A. D. 1929.

M. J. Moore,
Acting Commissioner of Patents.

(Seal)